Figure 4:
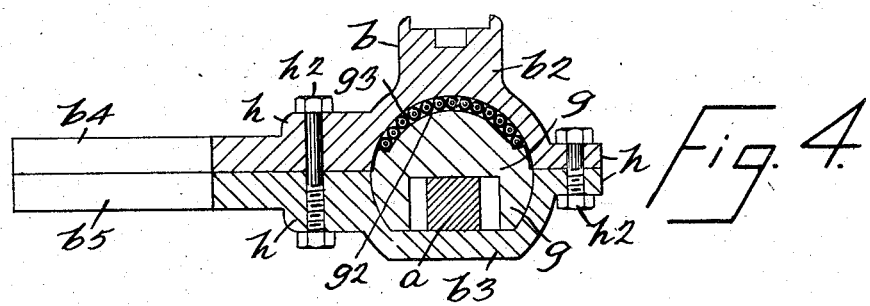

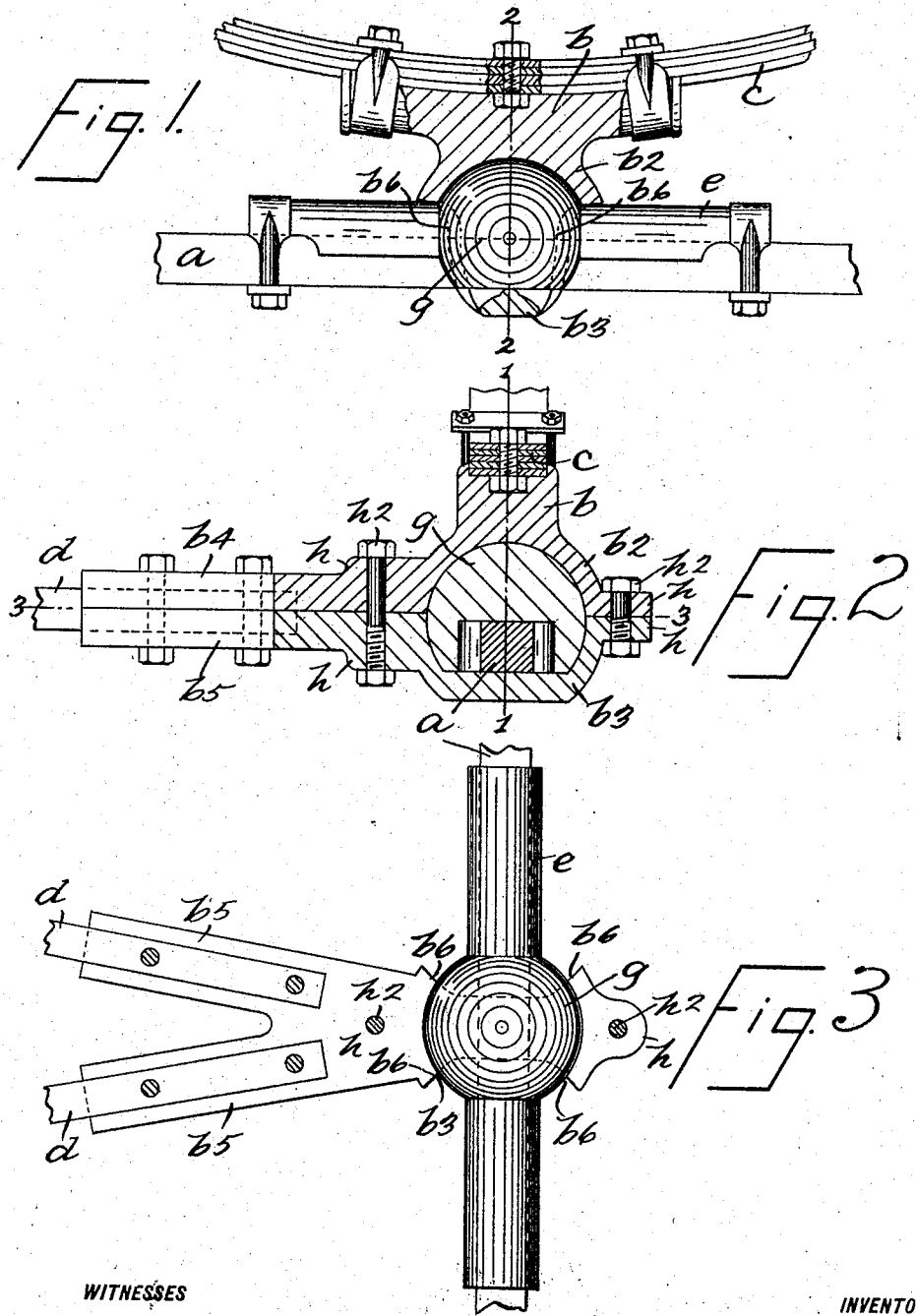

No. 806,605. PATENTED DEC. 5, 1905.
J. C. WATSON.
FIFTH WHEEL COUPLING.
APPLICATION FILED MAY 18, 1905.

2 SHEETS—SHEET 2.

WITNESSES
J. C. Larsen
F. A. Stewart

INVENTOR
Joseph C. Watson
BY
Edgar Tate & Co.
ATTORNEYS.

UNITED STATES PATENT OFFICE.

JOSEPH C. WATSON, OF NEW YORK, N. Y.

FIFTH-WHEEL COUPLING.

No. 806,605.  Specification of Letters Patent.  Patented Dec. 5, 1905.

Application filed May 18, 1905. Serial No. 260,934.

*To all whom it may concern:*

Be it known that I, JOSEPH C. WATSON, a citizen of the United States, residing at New York, in the county of New York and State of New York, have invented certain new and useful Improvements in Fifth-Wheel Couplings for Vehicles, of which the following is a specification, such as will enable those skilled in the art to which it appertains to make and use the same.

This invention relates to fifth-wheel couplings for vehicles; and the object is to provide an improved device of this class which is made in the form of a ball-and-socket joint and which involves a minimum amount of friction and by means of which the front axle of a vehicle is free to turn within certain limits, whereby the vehicle may be turned or cramped or manipulated in the usual manner, and which also may be made of any desired strength, a further object being to provide a fifth-wheel coupling of the class specified which is fully protected and inclosed in such manner that dust, dirt, and other foreign substances cannot enter the same or collect therein; and with these and other objects in view the invention consists in a fifth-wheel coupling for vehicles, constructed as hereinafter described and claimed.

The invention is fully disclosed in the following specification, of which the accompanying drawings form a part, in which the separate parts of my improvement are designated by suitable reference characters in each of the views, and in which—

Figure 5:
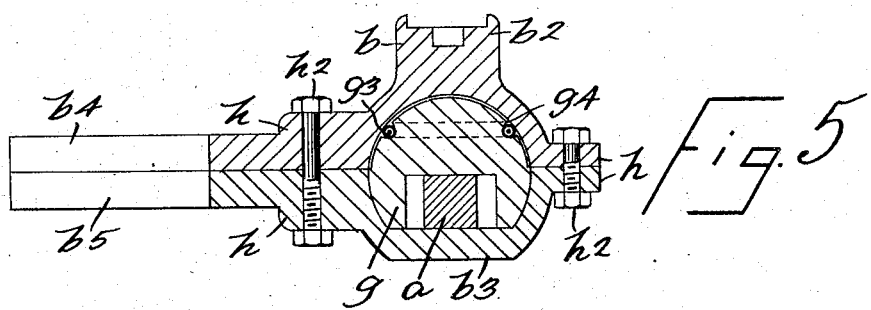
Figure 6:
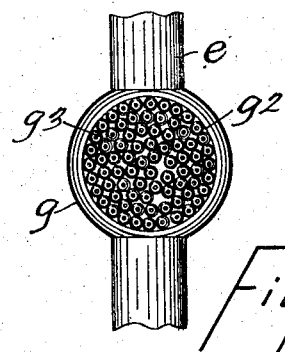

Figure 1 is a sectional front view of one form of my improved fifth-wheel coupling, the sectional parts being shown on the line 1 1 of Fig. 2; Fig. 2, a partial section on the line 2 2 of Fig. 1; Fig. 3, a plan view of said coupling; Fig. 4, a view similar to Fig. 2, but showing a modification and omitting certain parts of the construction shown in Fig. 2; Fig. 5, a view similar to Fig. 4, showing another modification; Fig. 6, a plan view of the ball portion of the coupling shown in Fig. 4, and Fig. 7 a similar view of the ball portion of the coupling shown in Fig. 5.

In the drawings forming part of this specification I have shown at $a$ a part of the front axle of a vehicle, and at $b$ the front bolster, with which in practice the front spring $c$ is connected; but the spring $c$ and its connection with the bolster $b$ form no part of this invention.

The socket member of my improved ball-and-socket fifth-wheel coupling is composed of a top member $b^2$, formed integrally with the bolster $b$, and a bottom member $b^3$, and said top member $b^2$ is provided with backwardly-directed arms $b^4$, with which the reaches $d$ are connected, and the bottom member $b^3$ is provided with similar backwardly-directed arms $b^5$, which correspond with the arms $b^4$, and the reaches $d$ are secured between said arms $b^4$ and $b^5$, as clearly shown.

The socket member $b^2$ of my improved fifth-wheel coupling is provided in its opposite sides with horizontally-ranging openings $b^6$, (shown partially in full and partially in dotted lines in Fig. 3 and the transverse section of which is shown in Fig. 1,) and the axle $a$ is provided with a central reinforced member $e$, in connection with which the ball $g$ of the ball-and-socket coupling is formed, and the axle $a$ passes through the bottom portion of said ball $g$ and longitudinally through the bottom of the reinforce member $e$, and the bottom portion of the ball $g$ and the axle $a$ are flush and rest directly on the bottom member $b^3$ of the socket $b^2$, and the top portion of the socket member $b^2$ is semispherical in form except where the side openings $b^6$ are formed, and the said top portion of the socket member $b^2$ of the coupling forms a cap for said coupling, which incloses the ball member $g$ and that part of the axle $a$ which passes therethrough and protects said ball from dust, dirt, and other substances.

The front axle $a$ and the ball member $g$ of the ball-and-socket coupling are free to turn horizontally in the socket $b^2$ within certain limits, said limits being sufficient to permit the manipulation of the front axle in the turning of the vehicle, and in the form of construction shown in Figs. 1 to 3, inclusive, the top surface of the ball member $g$ fits snugly in the top part of the socket member $b^2$, as clearly shown in Fig. 2, and the friction in this case is only that which is occasioned by the weight of the front end of the vehicle which rests on the top surface of the ball member $g$.

Figure 7:
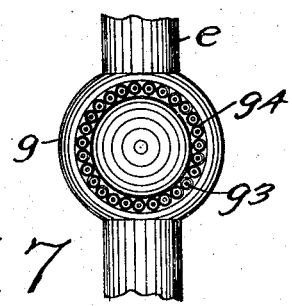

In Figs. 4 and 6 I have shown a modification in which the top surface of the ball member $g$ is provided with a recess or chamber $g^2$, in which are placed steel balls $g^3$, and this forms a ball-bearing between the top portion of the socket member $b^2$ and the top portion of the ball member $g$, and in Figs. 5 and 7 I have shown another modification, in which the ball member $g$ is provided around the top portion thereof with an annular groove $g^4$, in which the balls $g^3$ are placed, and both of the constructions shown in Figs. 4 and 6 and 5 and 7, respectively, form a simple and effective antifriction ball-bearing.

The top and bottom portions of the socket member $b^2$ are provided at the front and back with projecting jaws $h$, and bolts $h^2$ are passed therethrough for securing the separate parts of the socket member together, and the arms $b^4$ and $b^5$, to which the reaches $d$ are secured, are formed integrally with the backwardly-directed jaws $h$.

It will be seen from the foregoing description that the front axle passes through the socket member of my improved ball-and-socket fifth-wheel construction and is free to swing therein, the opposite sides of the socket member being open for this purpose, and the ball part of my improved ball-and-socket fifth-wheel construction is connected with the front axle, and my invention is not limited to the exact construction herein shown and described for accomplishing these results, and various changes in and modifications of said construction may be made without departing from the spirit of my invention or sacrificing its advantages, and while the bolster $b$ is shown as comparatively short and provided with a spring $c$ it will be apparent that the bolster $b$ may be made of any desired length, and the front end portion of the running-gear of the vehicle also may be made in any desired manner.

Having fully described my invention, what I claim as new, and desire to secure by Letters Patent, is—

A ball-and-socket fifth-wheel coupling for vehicles, comprising a socket member composed of top and bottom parts having backwardly-directed members with which the reaches are connected, said socket member being provided with side openings through which the front axle is passed, and said front axle being provided with a solid ball member which fits in and is free to turn with the axle in said socket member and in a horizontal plane, and ball-bearings placed between the ball member and the top portion of the socket member, substantially as shown and described.

In testimony that I claim the foregoing as my invention I have signed my name, in presence of the subscribing witnesses, this 17th day of May, 1905.

JOSEPH C. WATSON.

Witnesses:
 F. A. STEWART,
 C. J. KLEIN.